United States Patent [19]

Geibel

[11] Patent Number: 5,109,102
[45] Date of Patent: Apr. 28, 1992

[54] PREPARATION OF ARYLENE SULFIDE KETONE POLYMERS

[75] Inventor: Jon F. Geibel, Bartlesville, Okla.

[73] Assignee: Phillips Petroleum Company, Bartlesville, Okla.

[21] Appl. No.: 608,088

[22] Filed: Oct. 31, 1990

[51] Int. Cl.$^5$ .......................... C08G 2/00; C08G 4/00; C08G 75/14
[52] U.S. Cl. .................................... 528/226; 528/223; 528/224; 528/388
[58] Field of Search ................ 528/226, 388, 223, 224

[56] References Cited

U.S. PATENT DOCUMENTS

| | | | |
|---|---|---|---|
| 4,116,947 | 9/1978 | Edmonds et al. | 528/388 |
| 4,645,826 | 2/1987 | Iizuka et al. | 528/388 |
| 4,812,552 | 3/1989 | Cliffton et al. | 528/226 |

FOREIGN PATENT DOCUMENTS 62-820 3/1987 Japan.

Primary Examiner—Harold D. Anderson
Assistant Examiner—T. Mosley
Attorney, Agent, or Firm—Carl D. Corvin

[57] ABSTRACT

This invention relates to making an arylene sulfide ketone polymer. In accordance with this invention, a diahloaromatic ketone, a polar organic compound, and an alkali metal sulfide are mixed together to form a first reaction mixture. This first reaction mixture is subjected to a first set of polymerization conditions effective to produce a polymerization mixture. This polymerization mixture is then dehydrated to form a dehydrated polymerization mixture. Additional dihaloaromatic ketone and polar organic compound is then mixed with the dehydrated polymerization mixture to form a second reaction mixture. This second reaction mixture is then subjected to a second set of polymerization conditions such that an arylene sulfide ketone polymer is formed.

13 Claims, No Drawings

PREPARATION OF ARYLENE SULFIDE KETONE POLYMERS

BACKGROUND OF THE INVENTION

This invention relates to a process for making an arylene sulfide ketone polymer.

The production of thermoplastic polymers is a major industry of the United States of America. It has been estimated that the production, in the United States, of a few of the more important thermoplastic polymers, approached forty-four billion pounds, or about twenty billion kilograms, in 1989.

Thermoplastic polymers are highly valued for their molding and processing characteristics. These characteristics make them highly desirable for the mass production of items such as pipes, films, fibers, dishes, utensils, automobile parts, beverage containers, and assorted other consumer items.

Thermoplastic polymers have the ability to be repeatedly softened when heated and hardened when cooled. This allows a recycling company to use thermoplastic waste products as building blocks for new and useful items. In contrast, thermosetting polymers do not have the ability to be repeatedly formed into other products. The reason is that thermosetting polymers cannot be remelted or remolded without destroying the original characteristics of the polymer.

Historically though, thermoplastic polymers tend to be inferior to thermosetting polymers in high temperature strength and chemical stability applications. However, in recent years a variety of thermoplastic polymers have been developed which can be employed at relatively high temperatures and/or under corrosive conditions.

However, these new resistant thermoplastic polymers also have problems. For example, these new polymers may have a molecular weight that is not high enough to maintain a good balance of physical properties, and consequently articles made from these polymers will not be as useful. This is why much research has been done to make a high molecular weight thermoplastic polymer which is both thermally and chemically resistant while maintaining the physical properties of the polymer.

Arylene sulfide ketone polymers are an example of this development. In particular, poly(phenylene sulfide ketone) (PPSK) is known in the art as a polymer which has a high melting point. Thus, PPSK is desired in applications requiring a high thermal resistance. For example, PPSK can be used for coatings on electrical wiring and as parts on automobile engines.

Arylene sulfide ketone polymers are also especially useful in applications where they reinforced with heat resistant fibers, filaments, or fillers, thus providing heat resistant reinforced structures. These structures show a degree of toughness and thermal resistance which makes them uniquely useful in the specialty applications required for space and defense work.

However, as stated before, these polymers suffer from problems which makes them difficult to work with. For example, these polymers tend to form low particle size solids during synthesis. These small particles can then become airborne which is undesirable. Additionally, the small particle size of the polymer can present a substantial separation problem to the polymer manufacturer.

This invention addresses these problems by presenting a process which gives a larger particle size polymer thereby reducing problems associated with a small particle size polymer. Furthermore, this invention provides a process to make a higher molecular weight polymer while substantially maintaining the desired physical characteristics of the polymer.

SUMMARY OF THE INVENTION

It is an object of this invention to provide a process for producing an arylene sulfide ketone polymer with increased molecular weight.

It is another object of this invention to provide a process for producing an arylene sulfide ketone polymer with improved processing properties.

It is yet another object of this invention to provide a process for producing an arylene sulfide ketone polymer with a larger particle size.

In accordance with this invention, a diahloaromatic ketone, a polar organic compound, and an alkali metal sulfide are mixed together to form a first reaction mixture. This first reaction mixture is subjected to a first set of polymerization conditions effective to produce a polymerization mixture. This polymerization mixture is then dehydrated to form a dehydrated polymerization mixture. Additional dihaloaromatic ketone and polar organic compound is then mixed with the dehydrated polymerization mixture to form a second reaction mixture. This second reaction mixture is then subjected to a second set of polymerization conditions such that an arylene sulfide ketone polymer is formed.

DETAILED DESCRIPTION OF THE INVENTION

Dihaloaromatic Ketones

Suitable dihaloaromatic ketones which may be employed in this invention can be represented by the following formula:

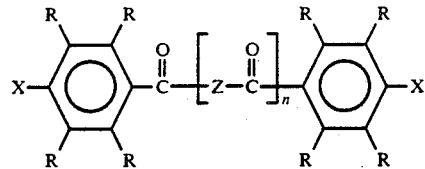

where:
(1) X is selected from the group consisting of fluorine, chlorine, bromine, and iodine:
(2) Z is a divalent radical selected from the group consisting of

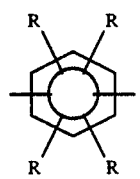 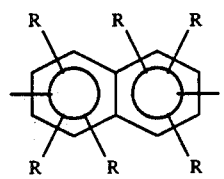

-continued

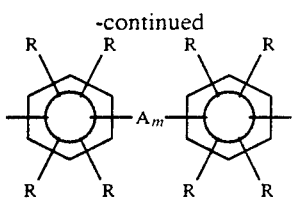

(3) n has a value of 0 or 1;
(4) m has a value of 0 or 1;
(5) A is selected from the group consisting of oxygen, sulfur, carbonyl, sulfonyl, or $CR_2$
(6) R is independently selected from the group consisting of hydrogen and alkyl radicals having 1 to 4 carbon atoms;
(7) the number of carbon atoms in all of the R groups is from 0 to 12.

Suitable examples of these types of compounds are:
4,4'-difluorobenzophenone;
4,4'-dichlorobenzophenone;
4,4'-dibromobenzophenone;
4,4'-diiodobenzophenone;
4-chloro-4'-fluorobenzophenone;
1,4-bis-(4-fluorobenzoyl) benzene;
1,4-bis-(4-chlorobenzoyl) benzene;
1-(4-chlorobenzoyl)-4-(4-fluorobenzoyl)benzene;
bis[4-(4-chlorobenzoyl)phenyl] thioether;
bis(2,3,5,6-tetramethyl-4-chlorophenyl) ketone;
bis[4-(4-chlorobenzoyl)phenyl] ether;
4,4'-bis-(4-chlorobenzoyl) biphenyl.

Presently the most preferred dihaloaromatic ketone is 4,4'-dichlorobenzophenone because of its effectiveness and commercial availability.

Generally, the amount of dihaloaromatic ketone employed depends upon the amount of alkali metal sulfide employed. Usually equal molar amounts will be utilized. The preferred molar ratio of dihaloaromatic ketone to alkali metal sulfide is from about 0.90:1 to about 1.10:1. Most preferably the molar ratio is from about 0.95:1 to about 1.05:1 because of desirable polymer properties obtained with this ratio.

POLAR ORGANIC COMPOUNDS

Suitable polar organic compounds which can be used in this invention for the production of arylene sulfide ketone polymers includes amides and sulfones. Examples include hexamethylphosphoramide, tetramethylurea, N,N'-ethylenedipyrrolidone, 1,3-dimethyl-2-imidazolidinone, N-methyl-2-pyrrolidone (NMP), pyrrolidone, caprolactam, N-ethylcaprolactam, sulfolane, N,N'-dimethylacetamide, diphenylsulfone, and mixtures of any two or more thereof. The preferred polar organic compound because of effectiveness and commercial availability is NMP.

The molar ratio of polar organic compound to alkali metal sulfide employed in this process is generally from about 4:1 to about 36:1. Most preferably, it is from about 8:1 to about 24:1 because it provides high polymerization concentration and thereby polymer production, while maintaining an easy to stir polymerization reaction mixture.

ALKALI METAL SULFIDES

Suitable alkali metal sulfides which can be employed in this process include lithium sulfide, sodium sulfide, potassium sulfide, rubidium sulfide, cesium sulfide, and mixtures of any two or more thereof.

If desired, the alkali metal sulfide can be prepared by the reaction of hydrogen sulfide with about twice the molar amount of an alkali metal hydroxide. The alkali metal sulfide can also be prepared by the reaction of an alkali metal hydrosulfide with an alkali metal hydroxide or carbonate. Suitable alkali metal hydroxides or carbonates which can be employed to prepare the alkali metal sulfides include lithium hydroxide, sodium hydroxide, potassium hydroxide, rubidium hydroxide, cesium hydroxide, lithium carbonate, sodium carbonate, potassium carbonate, rubidium carbonate, cesium carbonate and mixtures of any two or more thereof. Suitable alkali metal hydrosulfides include lithium hydrosulfide, sodium hydrosulfide, potassium hydrosulfide, rubidium hydrosulfide, cesium hydrosulfide, and mixtures of any two or more thereof.

It is preferred to employ the combination of alkali metal hydrosulfide with alkali metal hydroxide since, as disclosed in U.S. Pat. No. 4,716,212 of Gaughan, a controlled excess of alkali metal hydrosulfide with respect to alkali metal hydroxide can serve to control the inherent viscosity of the arylene sulfide ketone polymers produced. More preferably, the process of the present invention employs a mole percent excess of alkali metal hydrosulfide with respect to alkali metal hydroxide in the range of from about 0.5 to about 2.0 because as the alkali metal hydrosulfide is increased an increase in the polymer's molecular weight and a decrease in the polymer's melt stability is observed, thus this range represents the best compromise between these conflicting factors. Sodium hydrosulfide and sodium hydroxide are the preferred reaction components because of good results thus obtained and its commercial availability.

REACTION CONDITIONS

According to the summary of the invention, the above-mentioned components are mixed together such that a first reaction mixture is formed. This first reaction mixture is then subjected a first set of polymerization conditions such that a polymerization mixture is formed. This polymerization mixture is then dehydrated to form a dehydrated polymerization mixture. To this dehydrated polymerization mixture more dihaloaromatic ketone and polar organic compound is added to form a second reaction mixture. This second reaction mixture is then placed under a second set of polymerization conditions such that an arylene sulfide ketone is formed.

FIRST SET OF POLYMERIZATION CONDITIONS

The conditions employed in this step to prepare the polymerization mixture can vary widely but will generally include a reaction temperature within the range of from about 185° C. to about 350° C., and preferably from about 225° C. to about 275° C. The reaction time can also vary widely depending in part on the reaction temperature employed but generally will be within the range of from about ten minutes to about 72 hours, and preferably from about 1 hour to about 20 hours. The reaction pressure will generally be in the range of from about 1 psig to about 400 psig, preferably from about 150 psig to about 250 psig. Since the temperature, pressure, and time are interrelated factors the exact amounts to employ vary according to the exact processing requirements each individual user has to work within.

After the polymerization mixture is formed, it is dehydrated such that a dehydrated polymerization mixture is formed. Generally, after allowing the polymerization mixture to cool to about 140° C. to about 175° C., the polymerization mixture is allowed to dehydrate as it is heated. This polymerization mixture is allowed to dehydrate until a temperature in the range of about 190° C. to about 210° C. is obtained. Preferably the temperature is in the range of 195° C. to about 205° C. because dehydration is then essentially complete. After forming the polymerization mixture, additional dihaloaromatic ketone and polar organic compound is added to form a second reaction mixture.

SECOND SET OF POLYMERIZATION CONDITIONS

These conditions will generally include a reaction temperature within the range of from about 185° C. to about 350° C., and preferably from about 225° C. to about 275° C. The reaction time can also vary widely depending in part on the reaction temperature employed but generally will be within the range of from about ten minutes to about 72 hours, and preferably from about one hour to about 20 hours. The pressure will generally be in the range of from about 1 psig to about 400 psig, and preferably from about 150 psig to about 250 psig. Since the temperature, pressure, and time are interrelated factors the exact amounts to employ vary according to the exact processing requirements each individual user has to work within.

After forming the polymer, it can be treated by methods known in the art. For example, the polymer mixture can be diluted with water or a mixture of water and polar organic compound. The particulate arylene sulfide ketone polymer is then filtered from the mixture. The recovered polymer is generally washed with water at least once and preferably several times. A preferred recovery procedure includes a washing step in which the polymer is treated in the presence of an aqueous solution of a calcium salt, prior to a final washing with water.

EXAMPLE

This example is provided to further assist a person skilled in the art with understanding this invention. The particular reactants, conditions, and the like, are intended to be merely illustrative of this invention and are not meant to be construed as unduly limiting the reasonable scope of this invention.

The polymer obtained from each of the runs was analyzed to obtain both the inherent viscosity and the thermal transition temperatures of the polymer.

The inherent viscosity, also called the logarithmic viscosity number, was measured because this number is a measure of the polymer's molecular weight. In fact, the simplicity of the measurement and the usefulness of the viscosity-molecular weight correlation is so great that the viscosity measurement constitutes an extremely valuable tool for the molecular characterization of a polymer.

In the present runs, the inherent viscosity was determined by dissolving 0.25 grams of polymer in concentrated sulfuric acid at room temperature to make 50 milliliters of solution. Ten milliliters of the solution was added to a #200 Ostwald-Fenske viscometer and immersed in a 30° C. constant temperature bath.

The thermal transition temperatures help to characterize the polymer. In particular, the glass transition temperature, the cold crystalline temperature and the melt temperature were determined. The glass transition temperature ($T_g$) is a characteristic temperature at which the polymer undergoes the transition from the glassy state to the rubbery state. The cold crystallization temperature ($T_{cc}$) is the temperature at which the amorphous polymer crystallizes when heated from the glassy state. The melt temperature ($T_m$) is the temperature at which the crystalline phase melts.

These thermal transitions were recorded on a Perkin Elmer DSC-2C Differential Scanning Calorimeter. Polymer samples were sealed in aluminum pans, heated to 375° C. and quenched rapidly to −196° C. Rescanning the sample from room temperature at 20° C./minute produce a thermogram which revealed $T_g$, $T_{cc}$, and $T_m$. The glass transition temperature was reported as the temperature at the midpoint of the transition. Crystallization and melting temperatures are reported as the maxima of the transitions.

Control A

This run provides comparative data about PPSK when it is prepared with a second addition of dihaloaromatic ketone step but without the dehydration step.

Procedure

To a one liter reactor fitted with a propeller stirrer, internal cooling coils, overhead condenser, and nitrogen inlet tube, the following was added:
(1) 0.294 gram-moles of sodium hydrosulfide (NaSH);
(2) 0.288 gram-moles of sodium hydroxide (NaOH);
(3) 0.288 gram-moles of 4,4-'-dichlorobenzophenone (DCBP); and
(4) 3.46 gram-moles of N-methyl-2-pyrrolidone (NMP).

The reactor was then sealed up. The sealed system was then deoxygenated with pressurized nitrogen gas. Following this deoxygenation, the system was heated to a temperature of 250° C. This temperature was then maintained for three hours. After this, the system was cooled to about 200° C. via internal cooling coils. When the system reached 200° C., a deoxygenated solution of 0.00796 gram-moles of DCBP in 1.01 gram-moles of NMP was mixed with the system. The system was then heated back to a temperature of 250° C. This temperature was then maintained for one hour. Subsequently, the reactor was allowed to cool overnight to room temperature.

The product was a reddish-colored polymer. This polymer was washed exhaustively with distilled water and dried in a vacuum oven prior to testing. The final product was a fine off-white powder.

Run 1

This run provides data about PPSK prepared with a dehydration step and a second dihaloaromtaic ketone addition step.

Procedure

To a one liter reactor fitted with a propeller stirrer, internal cooling coils, overhead condenser, and nitrogen inlet tube, the following was added:
(1) 0.294 gram-moles of NaSH;
(2) 0.288 gram-moles of NaOH;
(3) 0.288 gram-moles of DCBP; and
(4) 3.46 gram-moles of NMP.

The reactor was then sealed up. The sealed system was then deoxygenated with pressurized nitrogen gas. The system was then heated to a temperature of 250° C. This temperature was then maintained for three hours.

After this, the system was cooled to about 170° C. with the cooling coils. When this temperature was reached, condensate was allowed to exit the reactor system. During this collection of the condensate, the boiling point temperature of the system rose from 170° C. to 202° C. under heating. All in all about 37.5 milliliters of condensate were collected. Next, a deoxygenated solution of 0.00796 gram-moles of DCBP in 1.00 gram-moles of NMP was added to the reactor system. The system was then heated to 250° C. This temperature was maintained for one hour. Subsequently, the reactor system was allowed to cool overnight to room temperature.

The product was a tannish-colored polymer. This polymer had larger particles than the polymer in run 1. The polymer was then washed exhaustively with distilled water and dried in a vacuum oven prior to testing.

Run 2

This run provides further data about PPSK prepared with an dehydration step and a second dihaloaromatic ketone addition step.

Procedure

To a one liter reactor fitted with a propeller stirrer, overhead condenser, and nitrogen inlet tube, the following was added:
(1) 0.294 gram-moles of NaSH;
(2) 0.288 gram-moles of NaOH;
(3) 0.288 gram-moles of DCBP; and
(4) 3.46 gram-moles of NMP.

The reactor was then sealed up. The system was then degassed with pressurized nitrogen gas. The system was then heated to 250° C. This temperature was maintained for three hours. The system was then cooled to about 150° C. When this temperature was reached, the system was vented and then purged with nitrogen. While heating, the system's boiling point temperature rose from 150° C. to 200° C., about 17 milliliters of condensate were collected. Next, a deoxygenated solution, of 0.00796 gram-moles of DCBP in 100 milliliters of NMP, was added to the system. The temperature of the system was then raised to 250° C. This temperature was then maintained for one hour. Subsequently, the reactor system was allowed to cool to room temperature.

The product was a purplish-colored polymer. This polymer had very large particles when compared to the polymer of run 1. The polymer was then washed and dried prior to testing.

CONTROL B

This run provides comparative data about PPSK when it is prepared with an dehydration step but without a second dihaloaromatic ketone addition step (a monohaloaromatic ketone was used instead).

PROCEDURE

To a one liter reactor fitted with a propeller stirrer, internal cooling coils, overhead condenser, and nitrogen inlet tube, the following was added:
(1) 0.294 gram-moles of NaSH;
(2) 0.288 gram-moles of NaOH;
(3) 0.288 gram-moles DCBP; and
(4) 3.46 gram-moles NMP.

The reactor was then sealed up. The system was then deoxygenated with pressurized nitrogen gas. After deoxygenation, the reactor system was heated to a temperature of 250° C. This temperature was maintained for three hours. Afterwards the system was cooled to about 150° C. via the cooling coils. The valve to the overhead condenser was then opened. The reactor was heated from about 150° C. to about 200° C. during which time about 12.5 milliliters of condensate were collected. The valve was then closed. Next a deoxygenated solution of 0.000796 gram-moles of 4-chlorobenzophenone (MCBP) in 1.00 gram-moles of NMP, was added to the reactor system. The system was then heated to 250° C. This temperature was maintained for one hour. Subsequently, the reactor system was allowed to cool overnight to room temperature.

The product was an unremarkable polymer. The polymer was then washed and dried to a constant weight prior to testing.

TABLE 1

| Run Number | Sample Number For Inherent Viscosity Measurements | Inherent Viscosity in Deciliters Per Gram | Thermal Transition Temperature in °C. | | |
|---|---|---|---|---|---|
| | | | $T_g$ | $T_{cc}$ | $T_m$ |
| Control A | 1 | 0.72 | 137.97 | 181.01 | 340.98 |
| | 2 | 0.72 | | | |
| 1 | 1 | 0.86 | 142.77 | 189.02 | 330.43 |
| | 2 | 0.86 | | | |
| | 3 | 0.75[1] | | | |
| | 4 | 0.76[1] | | | |
| | 5 | 0.86 | | | |
| 2 | 1 | 0.82 | 142.48 | 187.04 | NA[2] |
| | 2 | 0.82 | | | |
| | 3 | 0.82 | | | |
| Control B | 1 | 0.76 | 141.57 | 188.56 | 323.61 |
| | 2 | 0.76 | | | |

[1]Run number 1, sample numbers 3 and 4 are believed not to be representative of the inventive runs. Considering the consistency of the other viscosity results this seems to be a reasonable conclusion.
[2]No datum was obtained due to a sudden machine failure towards the end of the analysis.

It is apparent from the data in Table 1 that the polymers made from inventive runs 1 and 2 have substantially higher molecular weight than Controls A and B. This is shown by the higher inherent viscosities for inventive runs 1 and 2 relative to Controls A and B. Runs 1 and 2 utilized a second charge consisting of 4,4'-dichlorobenzophenone indicating a beneficial effect of using this second charge relative to Control B where 4-chlorobenzophenone was used. Thus, both the dehydration step and the second aromatic ketone addition step are essential for optimum results and the aromatic ketone must be a dihaloaromatic material.

That which is claimed is:
1. A process for preparing an arylene sulfide ketone polymer which comprises:
   (a) mixing an alkali metal sulfide, a dihaloaromatic ketone, and a polar organic compound to form a first reaction mixture;
   (b) subjecting said first reaction mixture to a first set of polymerization conditions effective to produce a polymerization mixture comprising polymer;
   (c) dehydrating said polymerization mixture to form a dehydrated polymerization mixture;
   (d) mixing additional dihaloaromatic ketone and polar organic compound with said dehydrated polymerization mixture to form a second reaction mixture; and
   (e) subjecting said second reaction mixture to a second set of polymerization conditions effective to give said arylene sulfide ketone polymer.
2. A process according to claim 1 wherein said alkali metal sulfide is selected from the group consisting of lithium sulfide, sodium sulfide, potassium sulfide, rubidium sulfide, cesium sulfide, or mixtures thereof.

3. A process according to claim 1 wherein said alkali metal sulfide is sodium sulfide.

4. A process according to claim 1 wherein said alkali metal sulfide is prepared in situ by reacting an alkali metal hydrosulfide with a compound selected from the group consisting of alkali metal hydroxides and alkali metal carbonates.

5. A process according to claim 1 wherein said alkali metal sulfide is prepared in situ by reacting hydrogen sulfide with an alkali metal hydroxide.

6. A process according to claim 3 wherein said sodium sulfide is prepared in situ by reacting sodium hydrosulfide with sodium hydroxide.

7. A process according to claim 1 wherein said dihaloaromatic ketone is selected from the group consisting of 4,4'-dichlorobenzophenone, 1,4-bis(4-chlorobenzoyl)benzene, 4,4'-bis(4-chlorobenzoyl)-biphenyl, or mixtures thereof.

8. A process according to claim 1 wherein said dihaloaromatic ketone is 4,4'-dichlorobenzophenone.

9. A process according to claim 1 wherein said polar organic compound is selected from the group consisting of N-methyl-2-pyrrolidone, 1,3-dimethyl-2-imidazolidinone, N-ethylcaprolactam, N-methylcaprolactam, sulfolane, diphenylsulfone, or mixtures thereof.

10. A process according to claim 1 wherein said polar organic compound is N-methyl-2-pyrrolidone.

11. A process according to claim 1 wherein said first set of polymerization conditions comprise:
 (a) a temperature from about 185° C. to about 350° C.;
 (b) a reaction time from about 10 minutes to about 72 hours;
 (c) a pressure from about 1 psig to about 400 psig.

12. A process according to claim 1 wherein said second set of polymerization conditions comprise:
 (a) a temperature from about 185° C. to about 350° C.;
 (b) a reaction time from about 10 minutes to about 72 hours;
 (c) a pressure from about 1 psig to about 400 psig.

13. A process for preparing poly(phenylene sulfide ketone) which comprises:
 (a) mixing sodium sulfide, 4,4'-dichlorobenzophenone, and N-methyl-2-pyrrolidone to form a first reaction mixture;
 (b) subjecting said first reaction mixture to a first set of polymerization conditions which comprise: a temperature from about 185° C. to about 350° C.; a reaction time from about 10 minutes to about 72 hours; a pressure from about 1 psig to about 400 psig; to produce a polymerization mixture comprising polymer;
 (c) heating and venting to dehydrate said polymerization mixture to form a dehydrated polymerization mixture;
 (d) mixing additional, 4,4'-dichlorobenzophenone and N-methyl-2-pyrrolidone with said dehydrated polymerization mixture to form a second reaction mixture; and
 (e) subjecting said second reaction mixture to a second set of polymerization conditions which comprise: a temperature from about 185° C. to about 350° C.; a reaction time from about 10 minutes to about 72 hours; a pressure from about 1 psig to about 400 psig; to produce said poly(phenylene sulfide ketone).

* * * * *